C. SHUMAN.
NECK-YOKE.

No. 169,487.  Patented Nov. 2, 1875.

WITNESSES:
F. McArdle
A. F. Terry

INVENTOR:
C. Shuman
BY
Munn
ATTORNEYS.

UNITED STATES PATENT OFFICE.

CHARLES SHUMAN, OF RED OAK, IOWA.

IMPROVEMENT IN NECK-YOKES.

Specification forming part of Letters Patent No. 169,487, dated November 2, 1875; application filed May 1, 1875.

*To all whom it may concern:*

Figure 1:
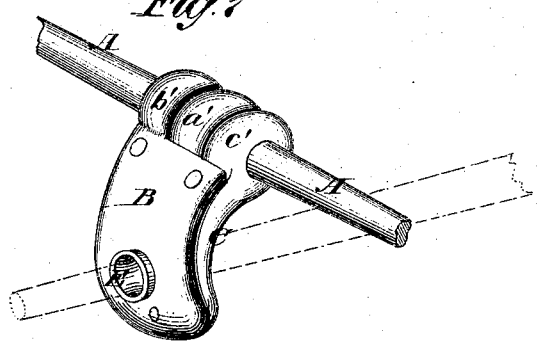
Figure 2:
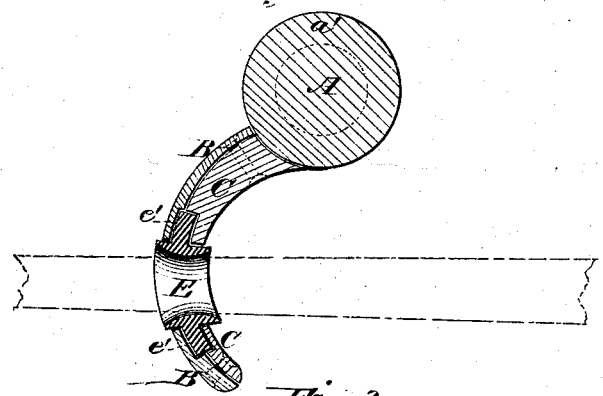
Figure 3:
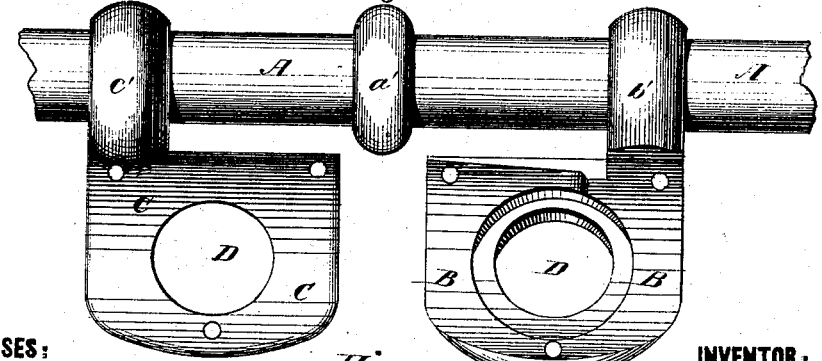
Figure 4:
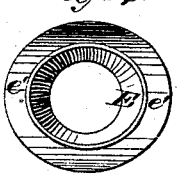

Be it known that I, CHARLES SHUMAN, of Red Oak, in the county of Montgomery and State of Iowa, have invented a new and useful Improvement in Neck-Yoke Ring, of which the following is a specification:

Figure 1 is a perspective view of the middle part of a neck-yoke to which my improvement has been applied. Fig. 2 is a detail section of the same. Fig. 3 is a detail rear view of the same separated, and the flanged bush being removed. Fig. 4 is a detail view of the flanged bush.

Similar letters of reference indicate corresponding parts.

The object of this invention is to furnish an improved device for connecting the neck-yoke with the tongue or pole of a carriage, which shall be simple in construction, strong, and durable, which will not weaken the neck-yoke, and may be readily applied.

The invention consists in the two curved plates fitting upon each other, having eyes formed upon the opposite ends of their upper edges, and having a tongue-hole formed in their lower middle parts, to adapt them to be attached to a neck-yoke to support a carriage-tongue, in the flanged bush in combination with the rabbeted tongue-hole of the two plates, and in the bead formed upon the center of the neck-yoke, in combination with the eyes of the two plates, as hereinafter fully described.

A represents a neck-yoke, upon the center of which is formed an enlargement or bead, $a'$. B C are two plates fitting snugly upon each other, and upon the opposite corners of the upper edges of which are formed eyes $b'$ $c'$, of such a size as to be slipped upon the neck-yoke A. In the lower middle part of the two plates B C is formed a hole, D, to receive the tongue or pole of a carriage. In the inner surface of one or both the plates B C, around the tongue-hole D, is formed a rabbet to receive the flange $e'$ formed around the bush E to keep the said bush in place. The bush E is designed to be made of rubber or other suitable material. The device B C E is curved, as shown in Fig. 2, so that it may be square with the tongue when in position for holding back. In applying the device the eyes $b'$ $c'$ of the two parts B C are slipped upon the neck-yoke A, one from each end, until the said eyes are close to the opposite sides of the bead $a'$. The bush E is then inserted in the tongue-hole, and the two parts are secured to each other, clamping the flange $e'$ of the bush E between them, by means of screws or rivets, so that they can be readily detached to renew the bush E when worn. The bead $a'$ strengthens the middle part of the neck-yoke, and keeps the device B C from slipping out of place.

Having thus described my invention, I claim as new and desire to secure by Letters Patent—

1. The combination of two curved plates, B C, fitting upon each other, having eyes $b'$ $c'$ on the opposite ends of their upper edges, and a tongue-hole in their lower middle parts, substantially as and for the purposes set forth.

2. The flanged bush E $e'$, in combination with the plates B C, having rabbeted tongue-hole D, substantially as set forth.

3. The neck-yoke A, having bead $a'$ on its center, in combination with the eyes $b'$ $c'$ of the plates B C, substantially as set forth.

CHARLES SHUMAN.

Witnesses:
M. J. NAUERTO,
J. C. SHUMAN.